United States Patent
Yaita (10) Patent No.: US 7,434,702 B2
(45) Date of Patent: Oct. 14, 2008

(54) BOTTLE CONTAINER MADE OF RESIN AND METHOD FOR MANUFACTURING THE SAME

(75) Inventor: Daisuke Yaita, Saitama (JP)

(73) Assignee: Kabushikikaisha Yaita Seisakusho, Saitama (JP)

( * ) Notice: Subject to any disclaimer, the term of this patent is extended or adjusted under 35 U.S.C. 154(b) by 523 days.

(21) Appl. No.: 10/742,769

(22) Filed: Dec. 23, 2003

(65) Prior Publication Data

US 2004/0134871 A1    Jul. 15, 2004

(30) Foreign Application Priority Data

Dec. 27, 2002   (JP)   ............... 2002-382198

(51) Int. Cl.
   *B65B 7/28*   (2006.01)
(52) U.S. Cl. .................. 215/44; 215/274; 220/610; 220/616; 220/614; 220/622
(58) Field of Classification Search ................ 220/319, 220/610, 616, 622, 614; 215/274, 379; 222/92, 222/107
   See application file for complete search history.

(56) References Cited

U.S. PATENT DOCUMENTS

| | | | |
|---|---|---|---|
| 739,616 A * | 9/1903 | Oxley ................... 215/379 |
| 779,749 A * | 1/1905 | Tinling ................. 215/11.1 |
| 1,070,516 A * | 8/1913 | O'brien ................ 215/382 |
| 1,536,443 A * | 5/1925 | Lermer ................. 222/107 |
| 1,706,034 A * | 3/1929 | Moore .................. 215/11.6 |
| 2,385,506 A * | 9/1945 | Gurwick ............... 222/107 |
| 2,434,505 A * | 1/1948 | Miller ................... 222/105 |
| 3,080,990 A * | 3/1963 | Parkinson et al. ...... 215/40 |
| 3,397,803 A * | 8/1968 | Melton ................. 215/256 |
| 3,874,558 A * | 4/1975 | Rockefeller ........... 222/92 |
| 3,940,008 A * | 2/1976 | Flanders .............. 220/4.07 |
| 4,338,278 A * | 7/1982 | Schultz ................ 264/261 |
| 4,526,297 A * | 7/1985 | Grimsley .............. 222/107 |
| 5,137,162 A * | 8/1992 | Fritz ..................... 215/40 |
| 5,901,882 A * | 5/1999 | Siegel .................. 222/131 |
| 6,116,439 A * | 9/2000 | Yaniv .................. 215/11.1 |
| 6,712,232 B2 * | 3/2004 | Tanaka et al. ........ 215/379 |
| 2005/0199629 A1 * | 9/2005 | Schlobohm .......... 220/319 |

FOREIGN PATENT DOCUMENTS

| | | |
|---|---|---|
| JP | 62-202713 | 9/1987 |
| JP | 9-215521 | 8/1997 |
| JP | 2001-113589 | 4/2001 |

* cited by examiner

*Primary Examiner*—Tri M Mai
(74) *Attorney, Agent, or Firm*—Wenderoth, Lind & Ponack, L.L.P.

(57) ABSTRACT

A bottle container made of resin includes a cylindrical barrel with a bottom and a cylindrical neck portion with a diameter smaller than that of the barrel. The bottle container also includes an upper part and a lower part divided into two parts by dividing at an upper end or a lower end of the barrel, and under the condition that the upper part and the lower part are connected with each other. The two parts are integrated by a cover member for liquid-tightly covering connecting surfaces of the two parts to shield the connecting surfaces from outside and to integrate the two parts with each other.

8 Claims, 14 Drawing Sheets

BOTTLE CONTAINER MADE OF RESIN AND METHOD FOR MANUFACTURING THE SAME

BACKGROUND OF THE INVENTION

The present invention relates to a bottle container made of resin for accommodating a liquid substance, the bottle container comprising a cylindrical neck portion on an upper end of a cylindrical barrel with a bottom, the neck portion having a diameter smaller than that of the barrel. The invention also relates to a method for manufacturing the bottle container. For instance, the invention relates to a bottle container made of resin for accommodating a liquefied cosmetic material such as mascara liquid and also to a method for manufacturing the bottle container.

In the past, a blow molding method has been used to manufacture a bottle container made of resin, which comprises a cylindrical barrel with a bottom and a cylindrical neck portion having a diameter smaller than that of the barrel (e.g. JP-A-2001-113589). However, by this blow molding method, it has been only possible to manufacture a bottle container with portions other than the neck portion having 3 mm in thickness at the most. It has been difficult to mold a bottle container of about 5 mm in thickness. Also, by this blow molding method, it has been difficult to mold a container which has a partially thicker portion. In this respect, it has been customary to use glass as the material to manufacture a container which has a thicker bottom or a relatively thick barrel and which gives the visual impression of a high quality product. For instance, glass is normally used to manufacture a bottle container for liquid cosmetic material (e.g. Japanese Patent Application 9-215521).

However, in the bottle container made of glass as described above, surface irregularities or distortion often occurs on inner surface of the container during molding process, and it has been difficult to produce bottle containers with the same and uniform volume. When the bottle containers are different in volume and are used for liquid cosmetic material, the liquid surface is not maintained at a constant level even when the same quantity of liquid cosmetic material is filled in each container by using a filling machine. If the liquid level in a container is lower than that of another container, it looks as if the volume of the liquid cosmetic material inside the container is less than that of the other container. For this reason, it has been customary to fill the liquid cosmetic material into the bottle container by a manual operation until the liquid level reaches a predetermined position in each of the bottle containers. However, the manual filling operation of the liquid cosmetic material requires troublesome procedure and is even uneconomical because higher material cost is required when the liquid cosmetic material is expensive.

SUMMARY OF THE INVENTION

It is an object of the present invention to provide a bottle container made of resin, in which a part of the container, (e.g. the bottom or the barrel), is relatively thick (about 5 mm in thickness) so as to give the visual impression of a high quality product, and which is uniform in volume, and when a constant quantity of liquid is filled in the container, the liquid surface is maintained always at a constant level. The invention also provides a method for manufacturing the bottle container with the above features.

The bottle container made of resin according to the present invention comprises an upper part and a lower part, divided at an upper end or at a lower end of a cylindrical barrel with a bottom, and under the condition where the upper part and the lower part are connected with each other, a cover member is used to cover the connecting surfaces of the upper part and the lower part so that the connecting surfaces can be shielded from outside.

Also, the method for manufacturing the bottle container made of resin according to the present invention comprises the steps of separately molding an upper part and a lower part of the bottle container, using resin by injection molding, the upper part and the lower part of the bottle container being divided at an upper end or at a lower end of a cylindrical barrel with a bottom, and under the condition that the upper part and the lower part are connected with each other. The method also includes injecting a molten resin to connecting portions of the two parts by insert molding, cooling and solidifying it to prepare a cover member, and liquid-tightly covering the upper part and the lower part by, the cover member so that connecting surfaces of these parts are shielded from outside and the two parts are integrated with each other.

DETAILED DESCRIPTION OF THE PREFERRED EMBODIMENTS

Figure 1:
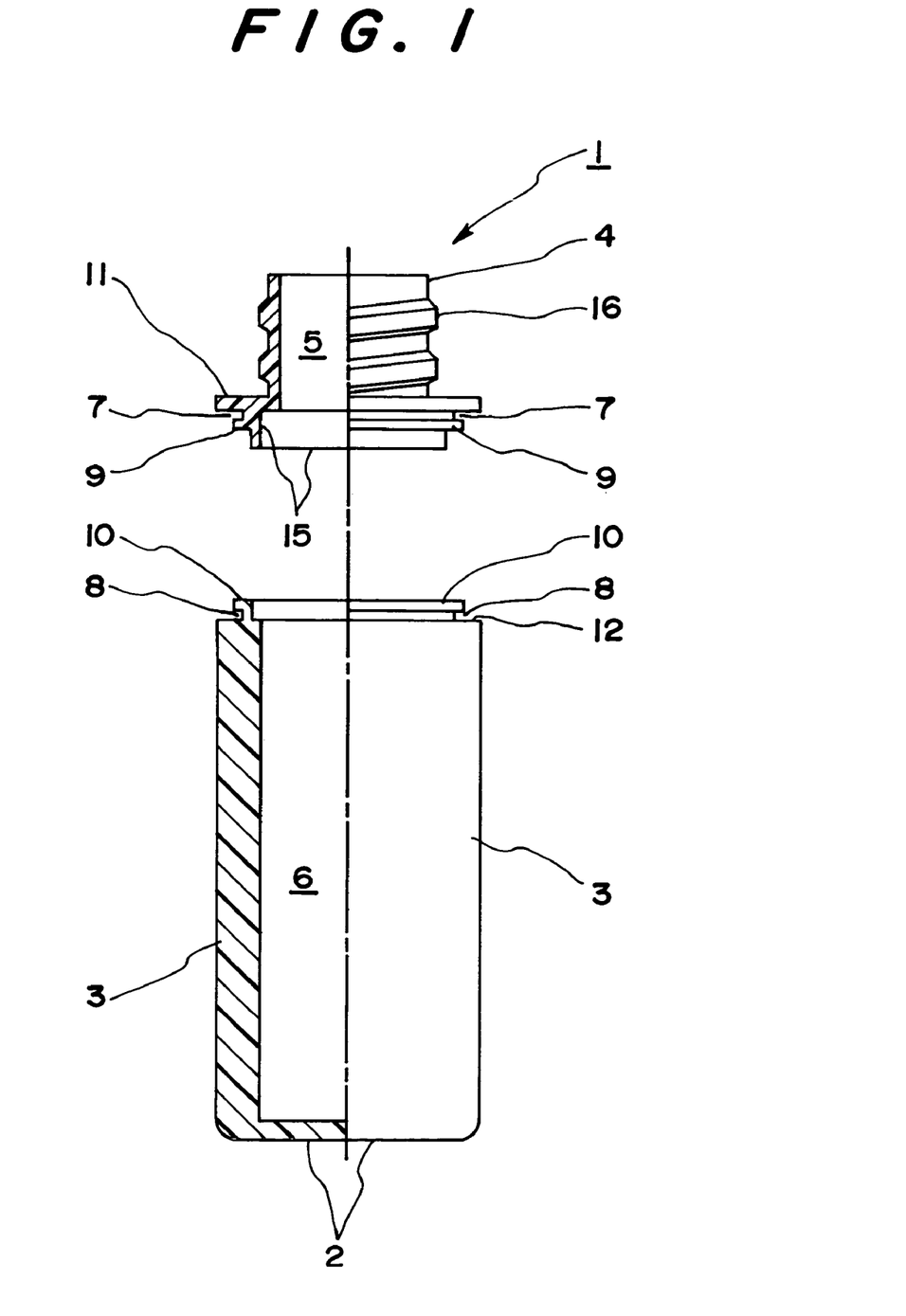
FIG. 1 is a longitudinal sectional view, showing a bottle container made of resin before an upper part thereof is connected with a lower part thereof.
Figure 2:
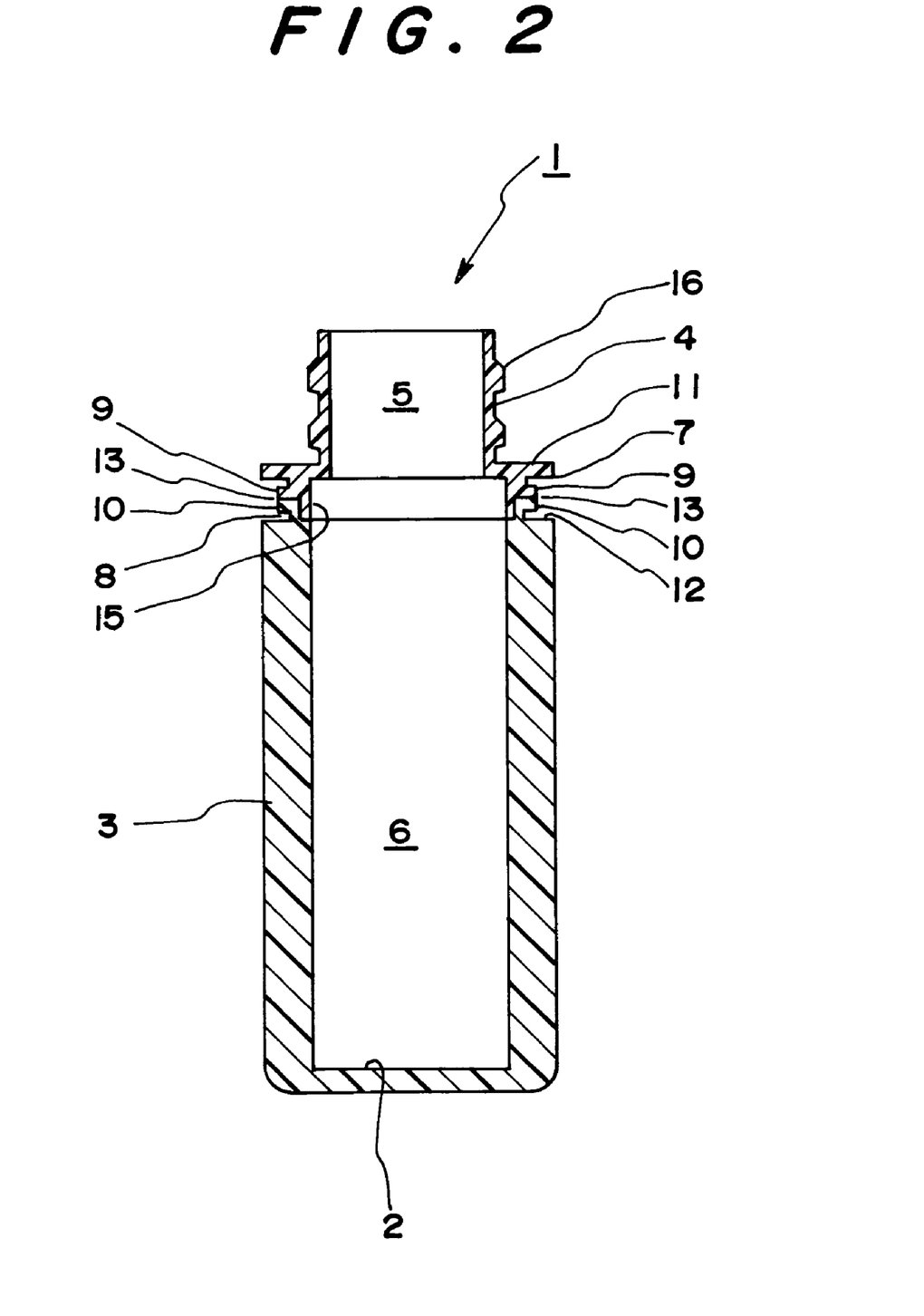
FIG. 2 is a longitudinal sectional view of a bottle container made of resin when the upper part is connected with the lower part thereof.

As shown in FIG. 1 and FIG. 2, a bottle container 1 made of polyethylene terephthalate (hereinafter referred as "PET") comprises a cylindrical barrel 3 with a bottom 2, and a cylindrical neck portion 4 with a diameter smaller than that of the barrel 3. At an upper end of the barrel 3, the bottle container is divided into two parts in vertical direction, i.e. an upper part 5 and a lower part 6.

Annular recesses 7 and 8 are provided respectively on an outer periphery of a lower end of the upper part 5 and on an upper end of the lower part 6. The annular recess 7 comprises a lower end collar 11 of the upper part 5 and a hook-shaped annular projection 9 arranged on a lower surface of the lower end collar 11 and being bent in an outward direction. The annular recess 8 comprises an upper end shoulder 12 of the lower part 6 and a hook-shaped annular projection 10 arranged on an upper surface of the upper end shoulder 12 and being bent in an outward direction. Each of the annular projections 9 and 10 constitutes an end of the division. The outermost edges of the lower end collar 11 and the upper end shoulder 12, (i.e. the outermost edges of the annular recesses 7 and 8), are aligned with an outer periphery of the barrel 3. On the lower surface of the annular projection 9 of the upper part 5, an engaging annular projection 15 is provided, which can be engaged with an inner peripheral surface of the annular projection 10 of the lower part 6.

Under the condition that the annular projections 9 and 10 are connected with each other (as shown in FIG. 2), an annular cover member 14 made of PET (FIG. 3) is liquid-tightly engaged in an annular connecting groove 13 defined by the annular recesses 7 and 8 so that the connecting surfaces of the upper part 5 and the lower part 6 can be shielded from outside. As a result, the parts 5 and 6 are integrated with each other and make up a bottle container 1. On an outer peripheral surface of the neck 4 of the upper part 5, a male screw is formed so that a cap (not shown) is to be screwed on it.

Figure 3:
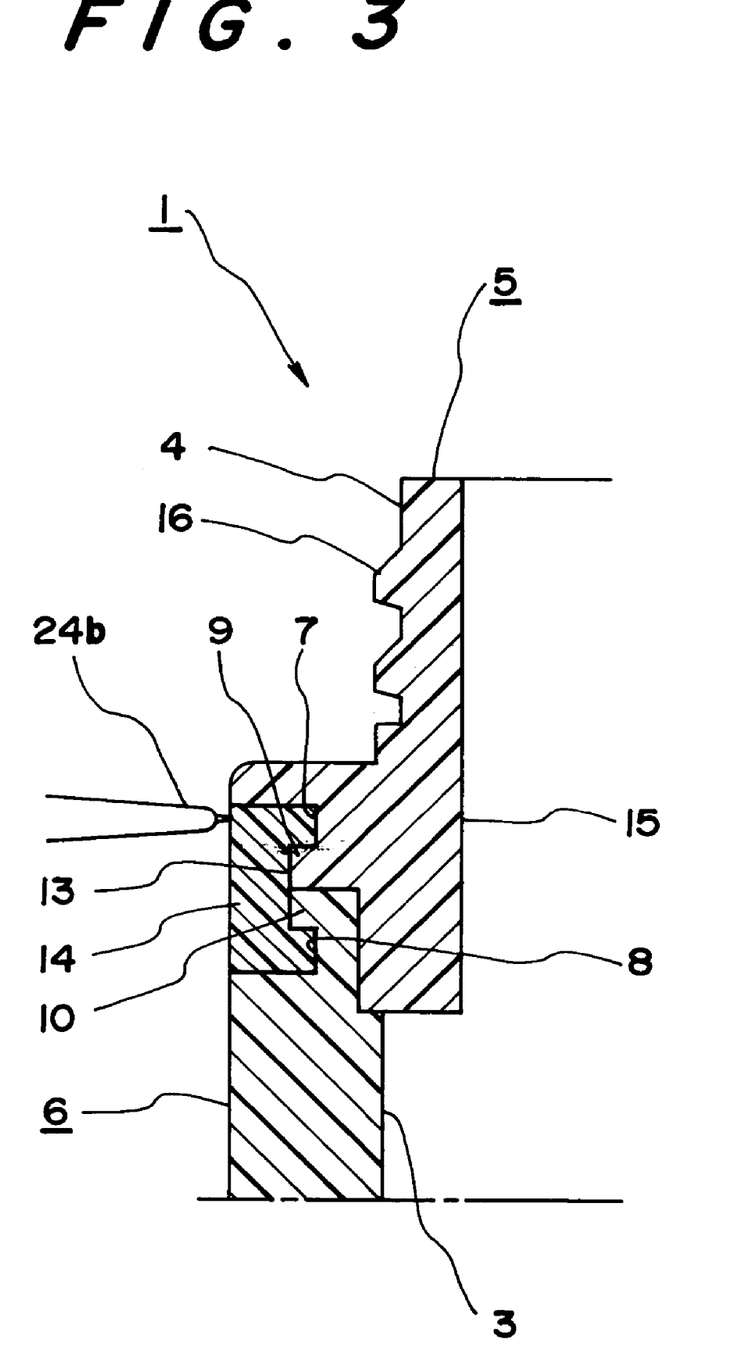
FIG. 3 is a partially enlarged longitudinal sectional view of a connecting portion of the bottle container made of resin.

In the bottle container 1 with the above arrangement, the engaging projection 15 of the upper part 5 is engaged tightly with an inner periphery of the annular projection 10 of the lower part 6, and the cover member 14 is engaged in the annular connecting groove 13. Thus, the annular projections 9 and 10 positioned in the depth of the annular connecting groove 13 are caught from above and underneath, and the upper part 5 and the lower part 6 are reliably integrated with each other. The PET material, i.e. the resin, used in the upper part 5, the lower part 6, and the cover member 14 has high adhesive property due to fusion and is difficult to be peeled off, and this is suitable for insert molding as described above.

Next, a description will be given of a method to manufacture the bottle container 1. First, brief description will be given of the insert molding machine to be used in a process to integrate the upper part 5 with the lower part 6. As shown in FIG. 4 to FIG. 7, an insert molding machine 16 comprises a molten resin feeding member 19 and a metal mold base 23. The molten resin feeding member 19 plays a role in supporting a feeding nozzle 17 and a positioner 18, and it is movable in a vertical direction. The metal mold base 23 is provided with a support member 20 for supporting the upper part 5 and the lower part 6 connected with each other, and it is provided with a part of sliding metal molds 21 and 22, which can be opened or closed by relatively sliding in a horizontal direction and can be separated from each other. When closed, the upper part 5 and the lower part 6 at a supporting position can be squeezed from a lateral direction. One of the sliding metal molds, e.g. the sliding metal mold 21 (shown on the left in the figure), is provided with a gate. When the metal molds are closed (See FIG. 5 and FIG. 6), a base end 24a of the gate 24 is connected with the lower end of the feeding nozzle 17 of the molten resin feeding member 19, and a gate port 24b at the end of the gate 24 is set to a position to engage with the annular connecting groove 13 at the connecting ends of the upper part 5 and the lower part 6.

Next, a description will be given of each process of the method for manufacturing the bottle container 1.

(Manufacturing Process 1)
First, the upper part 5 and the lower part 6 divided near the upper end of the barrel 3 are molded by an injection molding machine (not shown) using PET as resin material. In the molding process, the annular recess 7 defined by the lower end collar 11 and by the hook-shaped annular projection 9 is formed at the dividing end of the upper part 5, and the annular recess 8 defined by the upper shoulder 12 and the hook-shaped annular projection 10 is formed on an outer periphery of the dividing end of the lower part 6.

Figure 4:
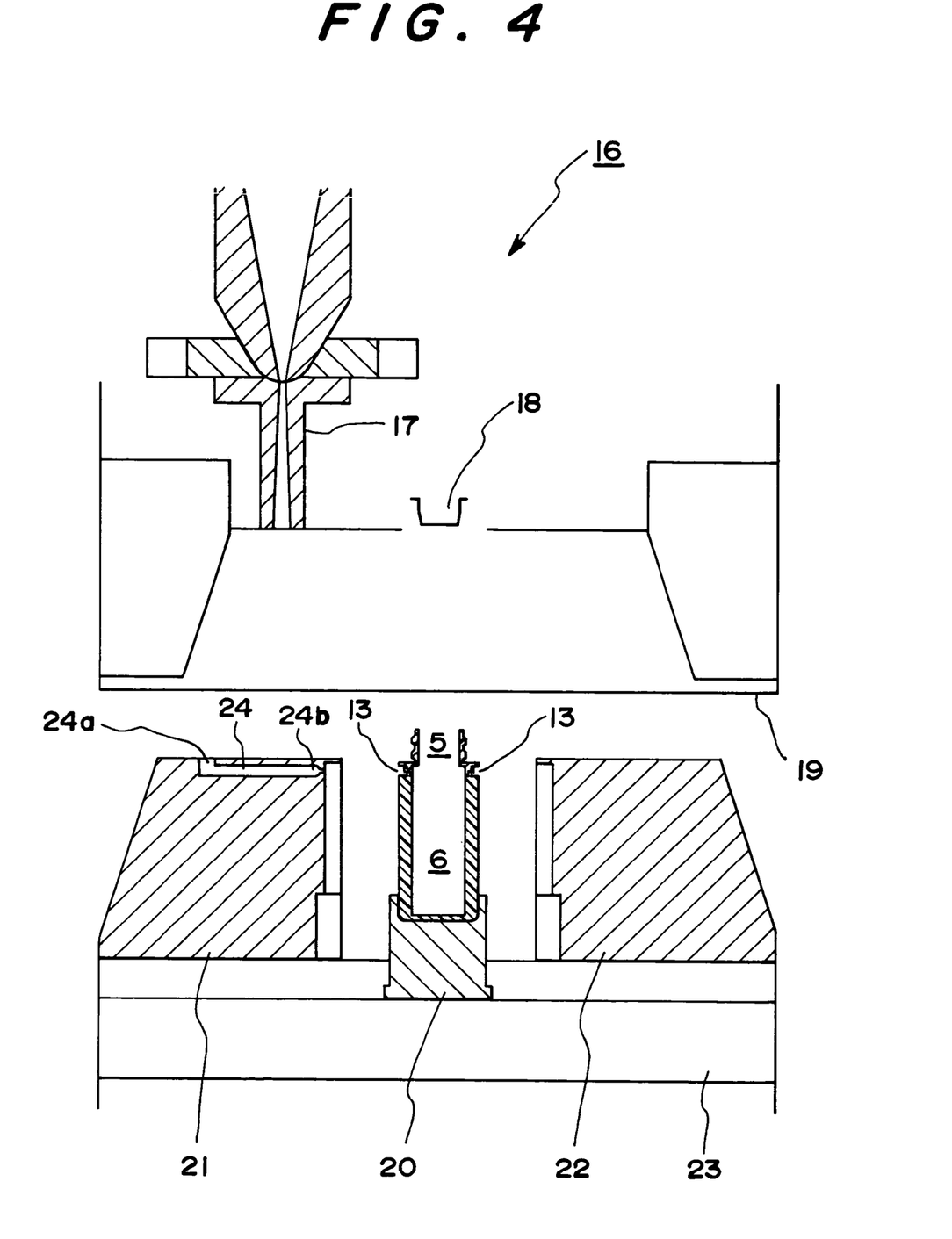
FIG. 4 is a schematical partial longitudinal sectional view when the upper part and the lower part of the bottle container are set in an insert molding machine.

(Manufacturing Process 2)
Next, on the support member 20 of the metal mold base 23 of the insert molding machine 16 under a standby condition (i.e. the condition where the molten resin feeding member 19 is moved up and the sliding metal molds 21 and 22 are opened), the upper part 5 and the lower part 6 prepared in the manufacturing process 1 are connected in a vertical direction (see FIG. 4).

Figure 5:
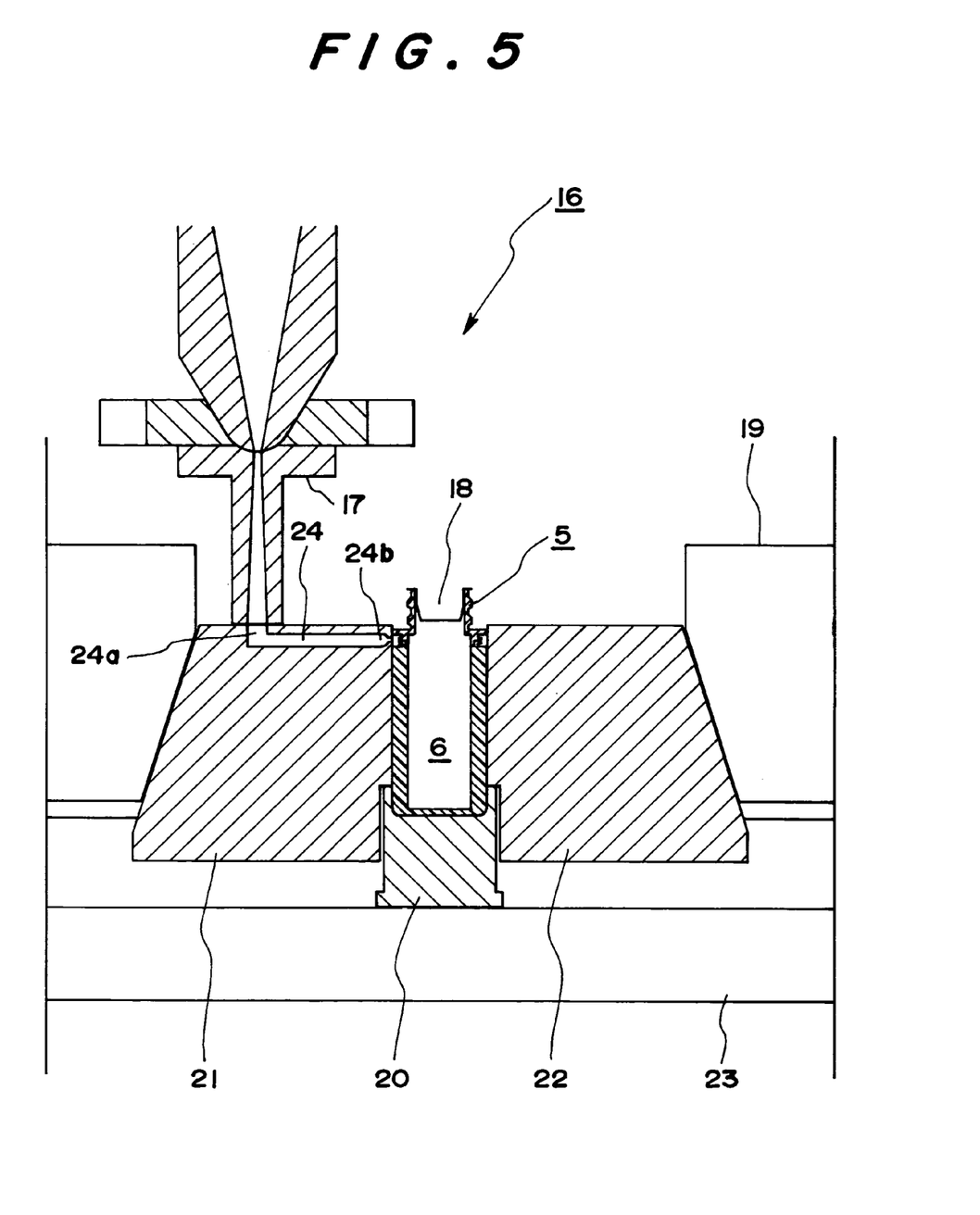
FIG. 5 is a schematical partial longitudinal sectional view when members of the insert molding machine are moved so that molten resin can be injected.

(Manufacturing Process 3)
When the insert molding machine 16 is operated, the molten resin feeding member 19 is moved down, and the positioner 18 is engaged with the upper end of the upper part 5 to determine the positions of the upper part 5 and the lower part 6 connected with each other. The sliding metal molds 21 and 22 are slid in direction to move closer to each other and are closed (FIG. 5). Under this condition, the lower end of the feeding nozzle 17 of the molten resin feeding member 16 is connected with the base end 24a of the gate 24, and the gate port 24b of the gate 24 is moved to a position to face the annular groove 13 of the upper part 5 and the lower part 6.

Figure 6:
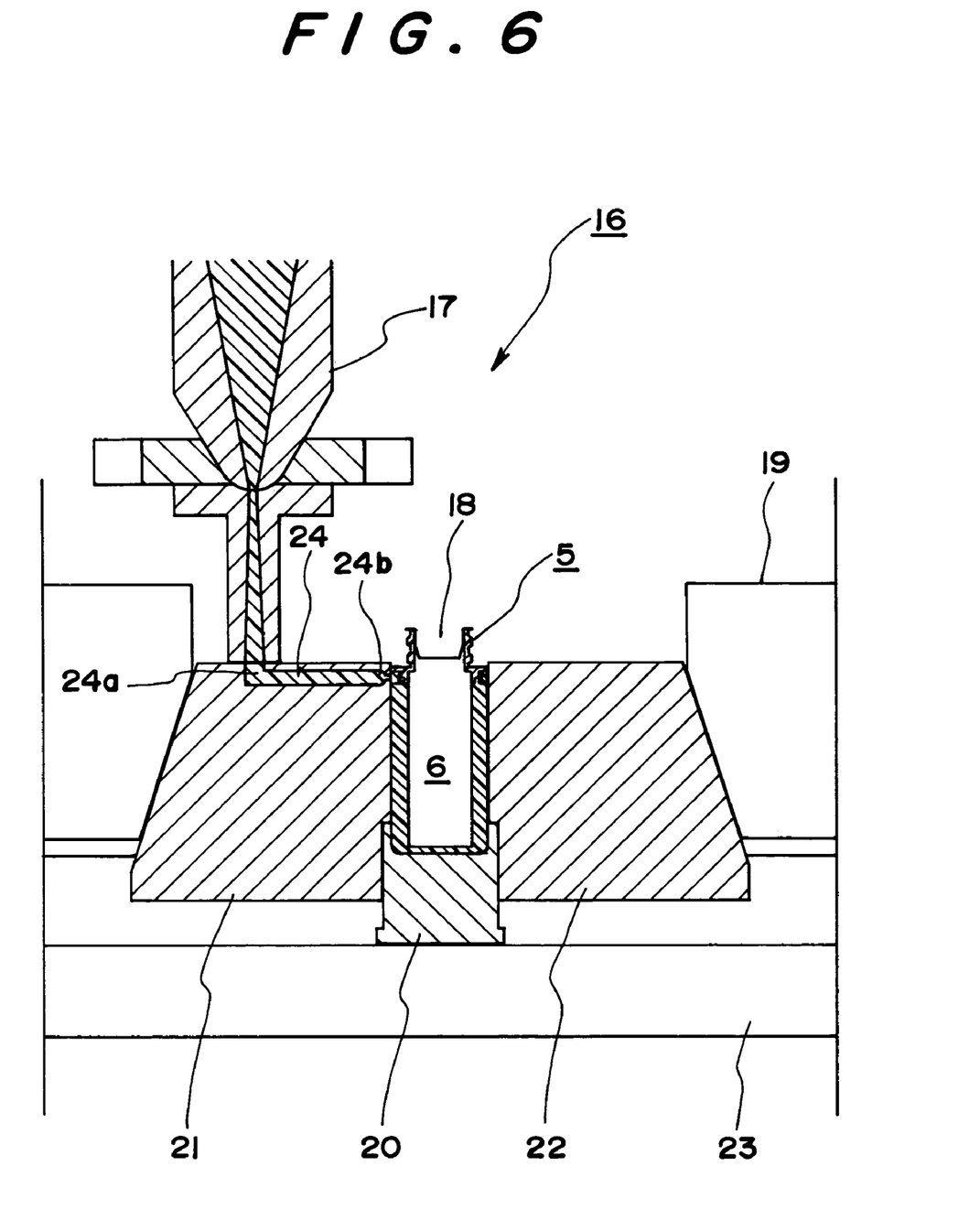
FIG. 6 is a schematical partial longitudinal sectional view when the molten resin is injected.

(Manufacturing Process 4)
Then, molten PET is sent into the feeding nozzle 17 of the molten resin feeding member 19, and it is fed into the annular connecting groove 13 from the gate port 24b via the gate 24 (FIG. 6).

Figure 7:
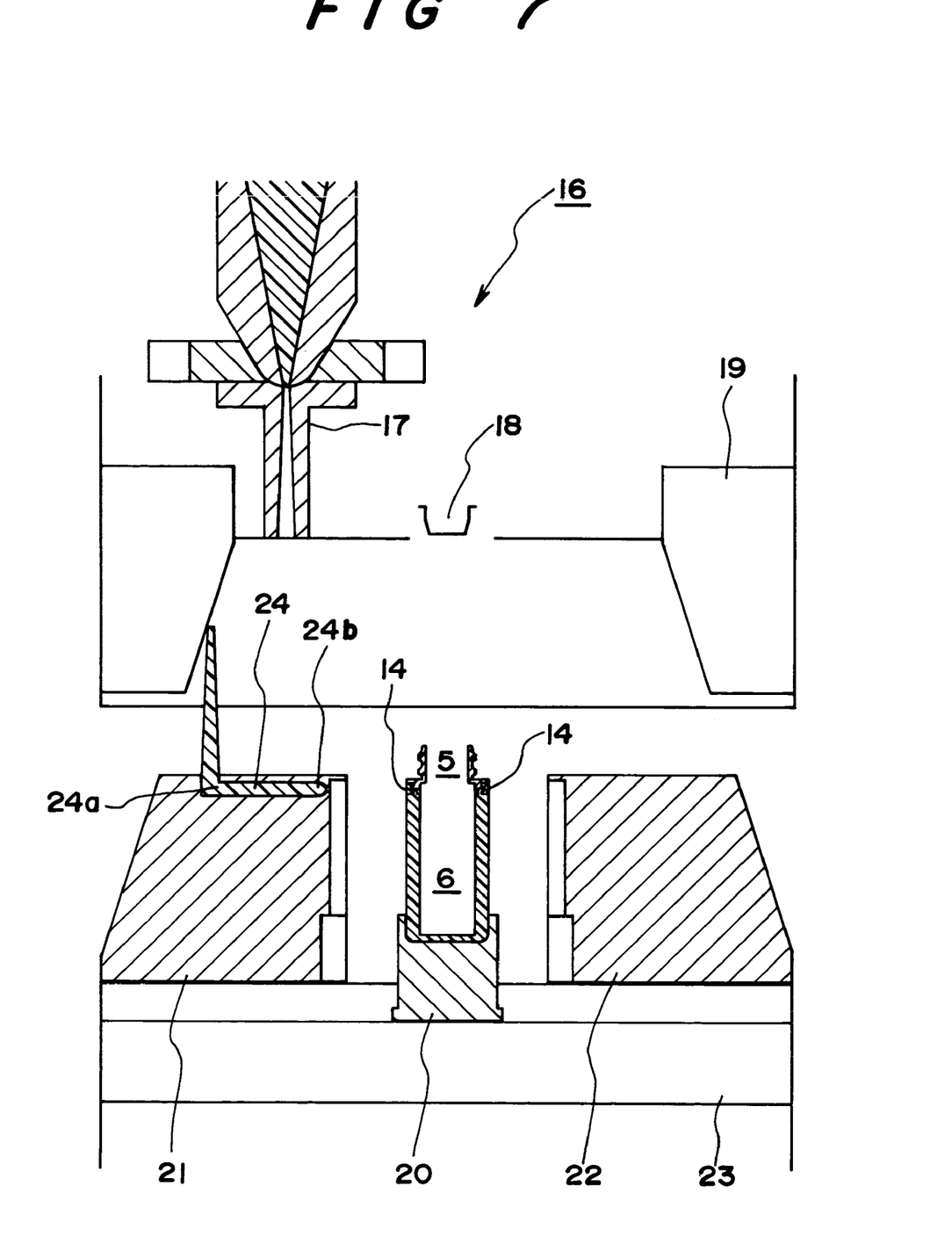
FIG. 7 is a schematical partial longitudinal sectional view when the injection of the molten resin has been completed and the members of the insert molding machine have been brought back to an initial position.

(Manufacturing Process 5)
Next, when the molten PET is fed completely into the annular connecting groove 13, the molten metal feeding member 19 is moved up to the standby position. The sliding metal molds 21 and 22 are slid in the direction to be separated from each other, and the insert molding machine 16 is set to the standby position (FIG. 7).

(Manufacturing Process 6)
When a certain time has elapsed under the standby condition, the molten PET is solidified in the annular connecting groove 13, and an annular cover member 14 is formed. The dividing ends of the upper part 5 and the lower part 6 are tightly attached to each other and are integrated, and the bottle container 1 is prepared. The bottle container 1 is then taken out.

According to the method for manufacturing the bottle container 1 as described above, the upper part 5 and the lower part 6 are separately molded by the injection molding machine, and these are integrated by insert molding. Thus, it is possible to easily manufacture the bottle container 1 made of resin having a neck portion 4 with a barrel 3 of about 5 mm in thickness, which has been difficult to manufacture by the conventional blow molding method. In the bottle container 1 manufactured by this method, PET is used as the molten resin for forming the upper part 5, the lower part 6, and the cover member 14. As a result, the cover member 14 after solidifying is firmly deposited on the inner surface of the annular connecting groove 13 of the upper part 5 and the lower part 6. This ensures a good adhesive property and rigid construction of the product, which is not easily peeled off.

The present invention is not limited to the embodiment as described above. For instance, the connecting portion of the upper part 5 and the lower part 6 divided into two parts at the upper end of the barrel 3 may be designed as shown in each of FIG. 8 to FIG. 10.

Figure 8:
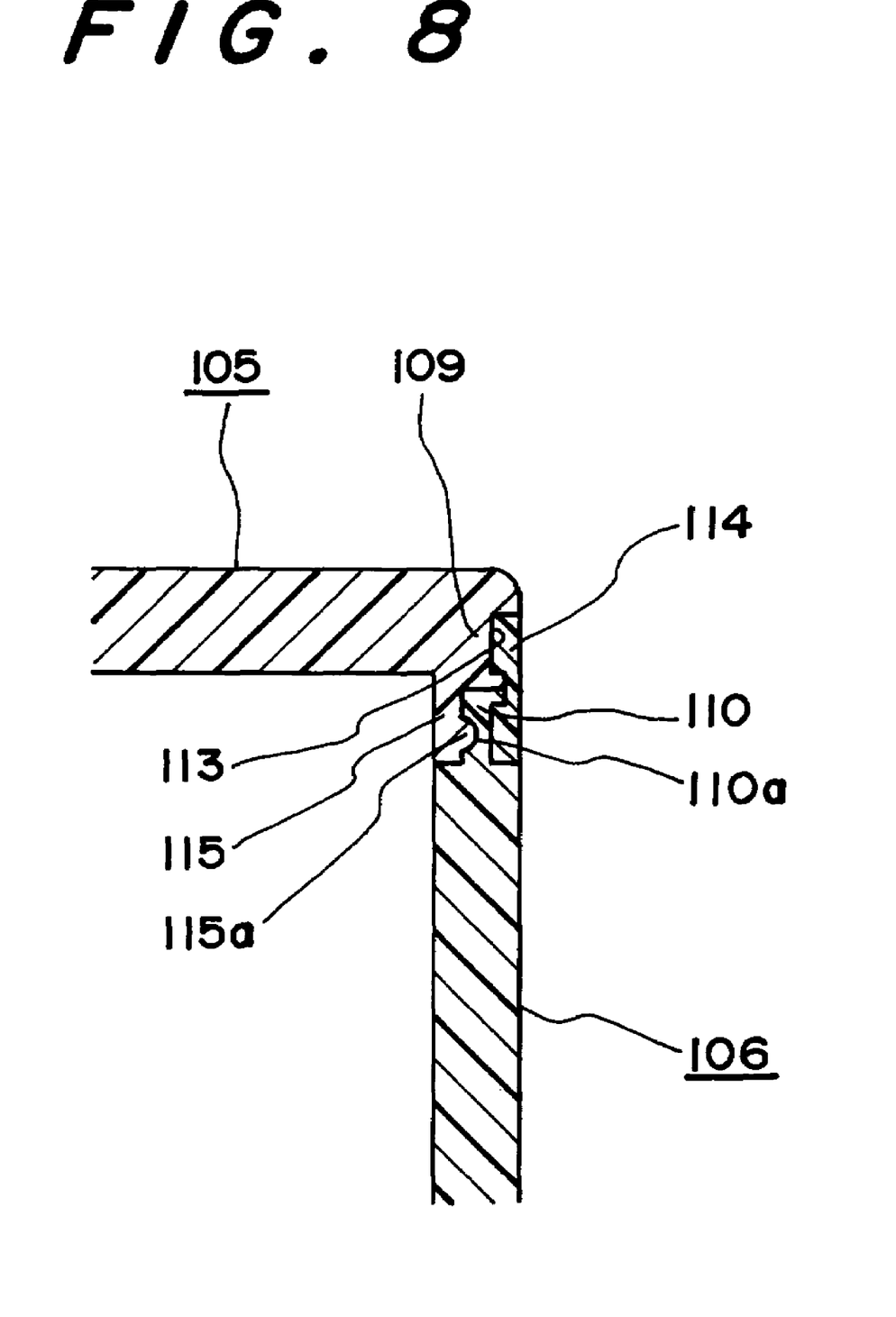
FIG. 8 to FIG. 14 each represents a partially enlarged longitudinal sectional view of another embodiment of the invention when the upper part and the lower part of the bottle container made of resin are connected with each other.

In the arrangement as shown in FIG. 8, an annular projection 115a is provided on an outer periphery of the lower end of an engaging projection 115 of the upper part 105, and an annular groove 110a engaged with the annular projection 115a is provided on an inner peripheral surface of the annular projection 110 of the lower part 106. By this arrangement, the upper part 105 and the lower part 106 are more tightly attached to each other. The cover member 114 is liquid-tightly engaged with the annular connecting groove 113 so that the connecting surfaces of the parts 105 and 106 are shielded from outside.

Figure 9:
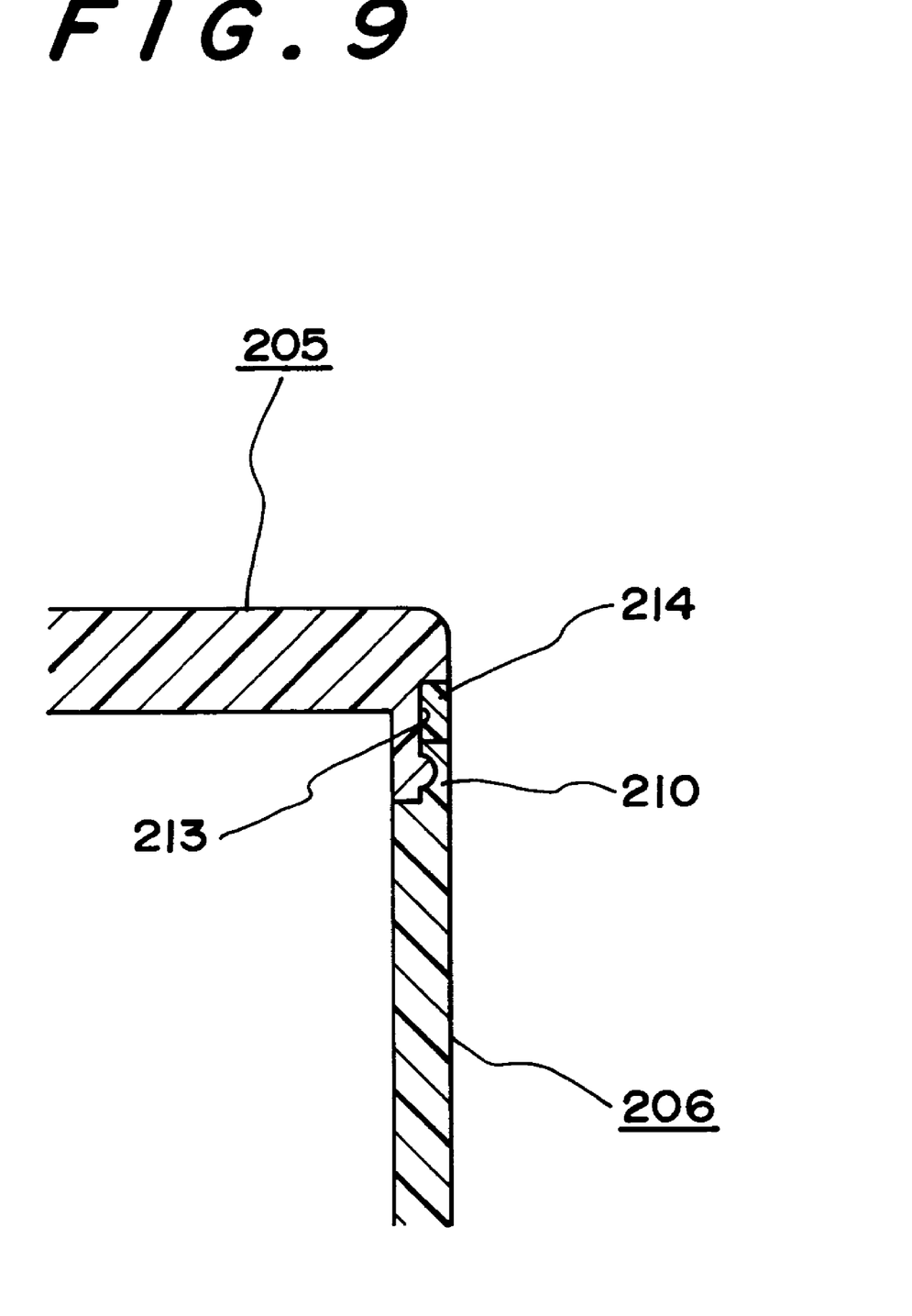

In the arrangement shown in FIG. 9, each of the annular projections 209 and 210 is designed in a straight form instead of a hook-shaped design. There is no annular recess, and the annular connecting groove 213 is defined by an outer peripheral surface of an annular projection 209, which is continuous to the connecting surfaces of the upper part 205 and the lower part 6, and by an upper end surface of an annular projection 210. The cover member 214 is liquid-tightly engaged in the annular connecting groove 213 so that the connecting surfaces of the parts 5 and 6 are shielded from outside.

Figure 10:
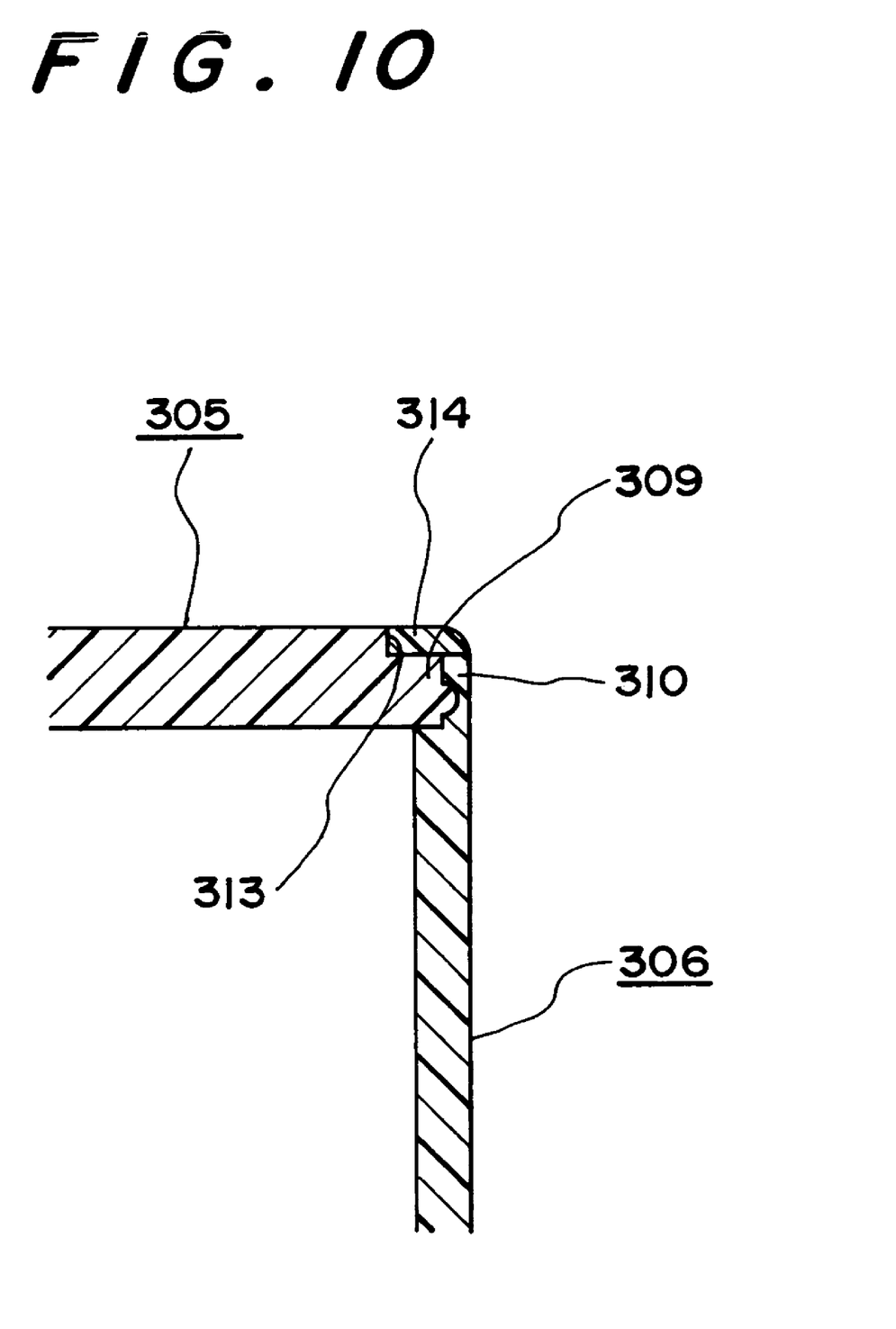

Further, in the arrangement shown in FIG. 10, an annular projection 309 is arranged on an outer peripheral surface of the upper part 305 so that it is protruded in a radial direction. There is no annular recess, and the annular connecting groove 313 is defined by an upper end surface of annular projections 309 and 310, which are continuous to the connecting surfaces of the parts 305 and 306. The cover member 314 is liquid-tightly engaged in the annular connecting groove 313 so that the connecting surfaces of the parts 305 and 306 are shielded from outside.

The connecting portion of the upper part 5 and the lower part 6 of the present invention may be designed in such a manner that these parts are divided into two parts at the lower end of the barrel 3 instead of the upper end of the barrel 3.

Figure 11:
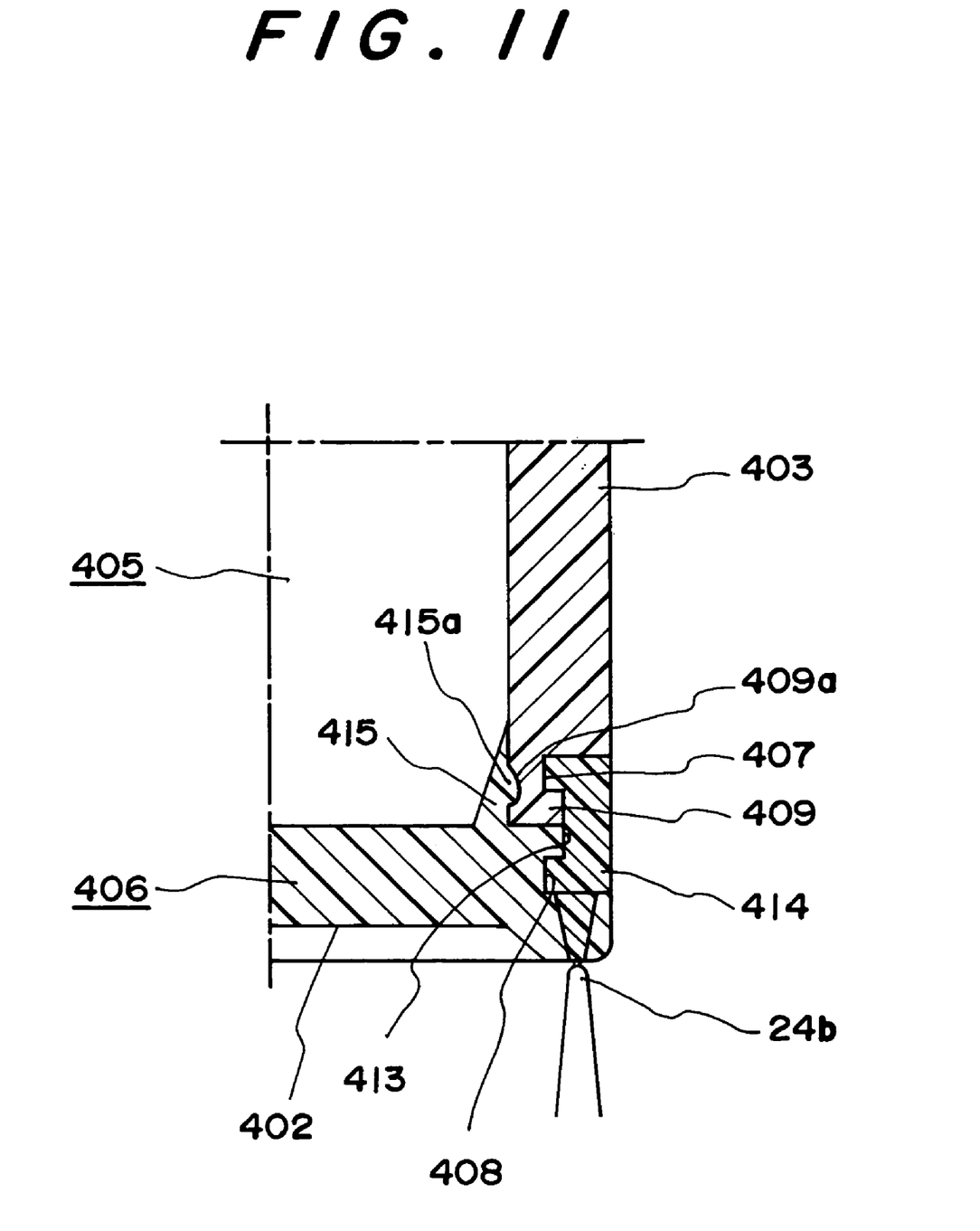

In the arrangement shown in FIG. 11, the upper part 405 comprises a neck portion (not shown) and a barrel 403, and the lower part 406 comprises only a bottom portion 402. A gate port 424b for the insert molding is formed on the lower surface of the outer edge of the bottom portion 402. An annular projection 415a is provided on an inner periphery of the engaging projection 415 of the lower part 406, and an annular groove 409a engaged with the annular projection 415a is arranged on an inner peripheral surface of the annular projection 409 of the upper part 405. The arrangement of the annular recesses 407 and 408 and the annular connecting groove 413 as well as the cover member 414 is the same as the arrangement in FIG. 8.

Figure 12:
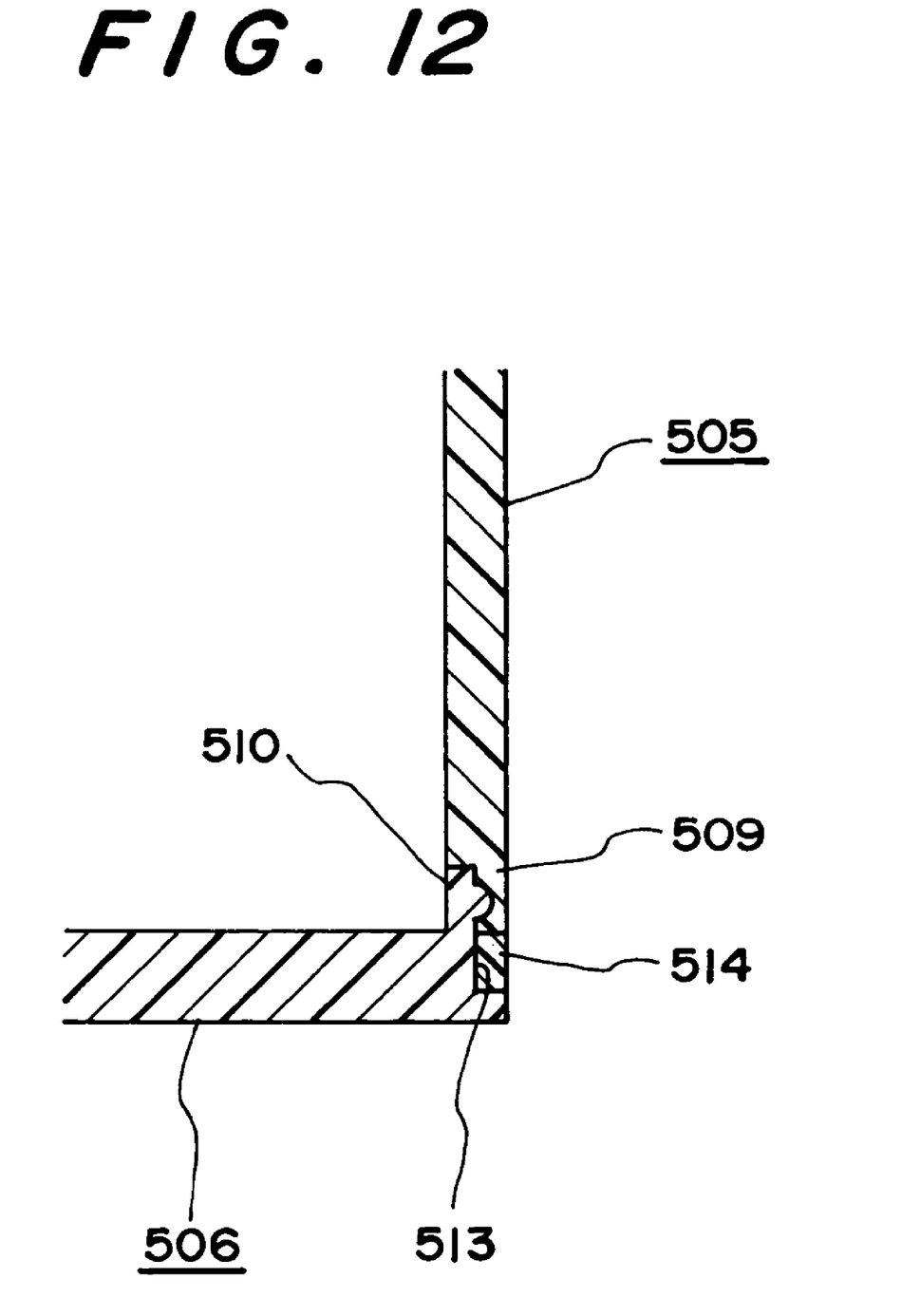

Also, in the arrangement shown in FIG. 12, an annular projection 509 of the upper part 505 and an annular projection 510 of the lower part 506 are designed in a straight form instead of a hook-shaped design. There is no annular recess, and the annular connecting groove 513 is defined by an outer peripheral surface of the annular projection 510 and by the upper end surface of the annular projection 509. The arrangement of the annular connecting groove 513 and the cover member 514 is the same as that of FIG. 9.

Figure 13:
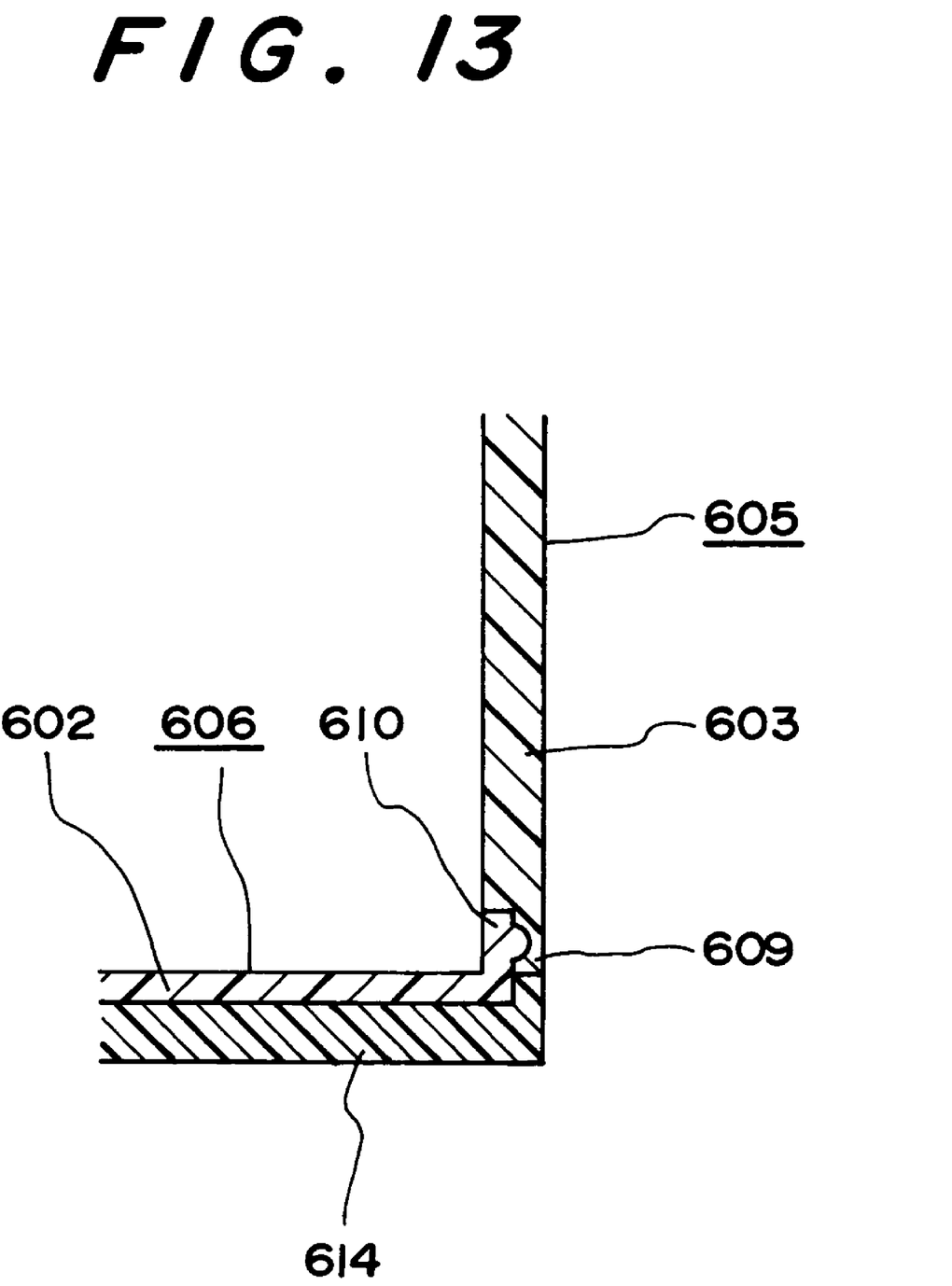

In the arrangement shown in FIG. 13, annular projections 609 and 610 are designed in a straight form, and the outer diameter of the bottom portion 602 of the lower part 606 is smaller than the outer diameter of the barrel 603 of the upper part 605. Neither an annular recess nor an annular connecting groove is provided. A cover member 614 in the form of a lid with an outer edge protruding upward is provided to shield the connecting surfaces of the upper part 605 and the lower part 606.

Figure 14:
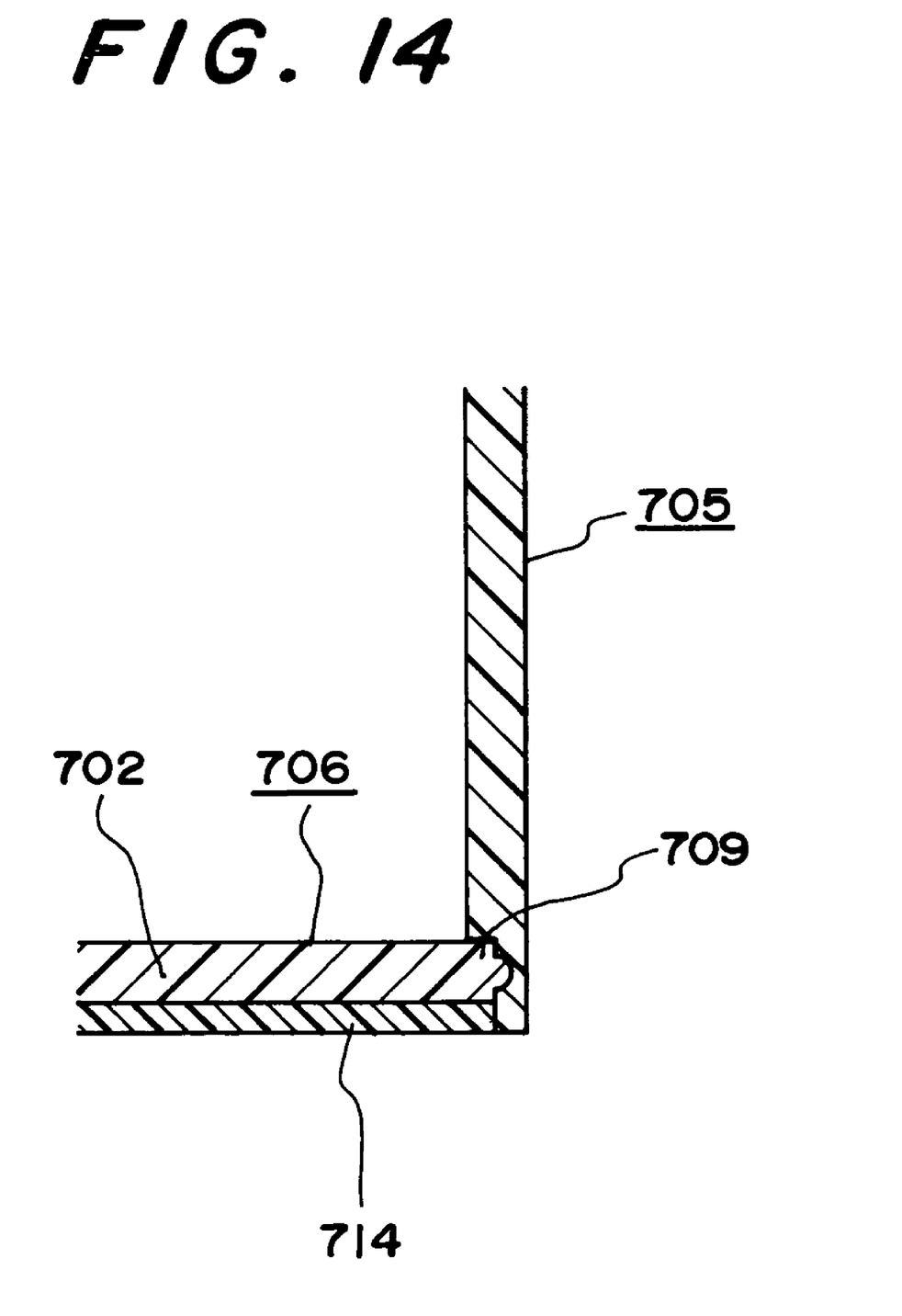

In the arrangement shown in FIG. 14, an annular projection 709 is formed on an outer peripheral surface of a bottom portion 702 of the lower part 706 by extending the bottom portion 702 in a radial direction. Neither an annular recess nor an annular connecting groove is provided. A cover member 714 in the form of a disk is engaged with an inner peripheral surface of the lower end of the upper part 705 so that it is tightly attached on the lower surface of the lower part 706, and the cover member is used to shield the connecting surfaces of the upper part 705 and the lower part 706 from outside.

As described above, in the bottle container according to the present invention, the upper part and the lower part separately molded are integrated by the use of a cover member. Thus, it is possible to manufacture a bottle container with a barrel of about 5 mm in thickness. Compared with the conventional type bottle container made of glass, the product is uniform in volume and coloring is easy to perform. Because the dividing portion is set to the upper end or the lower end of the bottle container, the product is rigid and sturdy in construction.

When an engaging projection to engage with a dividing end is arranged on the other dividing end of the upper part or the lower part, the upper part and the lower part can be integrated with each other in more reliable connecting condition. This is helpful to achieve higher strength of the bottle container.

Further, in the method for manufacturing the bottle container according to the present invention, the upper part and the lower part are molded separately, and these are then integrated by a cover member in the insert molding procedure. Thus, it is possible to easily manufacture a bottle container made of resin with a barrel of about 5 mm in thickness, which has a neck portion with a diameter smaller than that of the barrel and which is difficult to manufacture by the conventional blow molding procedure. Also, the dividing portion of the two parts is set to the upper end or the lower end of the bottle container. This prevents bending or deflection in an inward direction when the cover member is molded and also contributes to the improvement of strength of the product.

What is claimed is:

1. A bottle container made of resin, comprising:
  a cylindrical barrel having an outer circumferential surface, and having a bottom;
  a cylindrical neck portion provided at an upper end of said cylindrical barrel, said cylindrical neck portion having a diameter smaller than that of said cylindrical barrel, wherein an upper part of the bottle container and a lower part of the bottle container are directly connected to each other at a connecting portion of said cylindrical barrel so as to form an annular connecting groove defined by connecting surfaces of said upper and lower parts;
  a cover member arranged within said annular connecting groove and fused with said upper and lower parts within said annular connecting groove so as to fix said upper and lower parts together and liquid-tightly cover said connecting surfaces of said upper and lower parts, and so as to shield said connecting surfaces from outside and integrate said connecting surfaces of said upper and lower parts, said cover member having an outer circumferential surface, wherein said outer circumferential surface of said cover member is aligned with said outer circumferential surface of said cylindrical barrel such that no portion of said cover member protrudes outwardly beyond said outer circumferential surface of said cylindrical barrel in a radial direction, said outer circumferential surface of said cover member thereby being flush with said outer circumferential surface of said cylindrical barrel;
  an annular recess formed in said upper part; and
  an annular recess formed in said lower part,
  wherein said annular connecting groove is defined by said annular recesses of said upper and lower parts, and wherein said cover member is liquid-tightly attached to said annular connecting groove.

2. The bottle container according to claim 1, wherein said upper part of the bottle container and said lower part of the bottle container are directly connected to each other at only one connecting portion of said cylindrical barrel, said only one connecting portion being positioned either between said cylindrical neck portion and an upper end portion of said cylindrical barrel or between a lower end portion of said cylindrical barrel and said bottom.

3. The bottle container according to claim 1, wherein said connecting portion includes surfaces of said upper part of the bottle container and said lower part of the bottle container that contact each other so as to directly connect said upper part of the bottle container and said lower part of the bottle container to each other.

4. The bottle container according to claim 1, wherein said cover member completely fills said annular connecting groove.

5. A bottle container made of resin, comprising:
- a cylindrical barrel having an outer circumferential surface, and having a bottom;
- a cylindrical neck portion provided at an upper end of said cylindrical barrel, said cylindrical neck portion having a diameter smaller than that of said cylindrical barrel, wherein an upper part of the bottle container and a lower part of the bottle container are directly connected to each other at a connecting portion of said cylindrical barrel so as to form an annular connecting groove defined by connecting surfaces of said upper and lower parts;
- a cover member arranged within said annular connecting groove and fused with said upper and lower parts within said annular connecting groove so as to fix said upper and lower parts together and liquid-tightly cover said connecting surfaces of said upper and lower parts, and so as to shield said connecting surfaces from outside and integrate said connecting surfaces of said upper and lower parts, said cover member having an outer circumferential surface, wherein said outer circumferential surface of said cover member is aligned with said outer circumferential surface of said cylindrical barrel such that no portion of said cover member protrudes outwardly beyond said outer circumferential surface of said cylindrical barrel in a radial direction, said outer circumferential surface of said cover member thereby being flush with said outer circumferential surface of said cylindrical barrel;
- an annular recess formed in said upper part; and
- an annular recess formed in said lower part,
- wherein said annular connecting groove is defined by said annular recesses of said upper and lower parts, said cover member being liquid-tightly attached to said annular connecting groove,
- and wherein each of said upper and lower parts includes a connecting end, and one of said upper and lower parts includes an engaging projection arranged such that when said upper and lower parts are connected to each other at said connecting ends, said engaging projection is engaged with said connecting end of the other of said upper and lower parts.

6. The bottle container according to claim 5, wherein said upper part of the bottle container and said lower part of the bottle container are directly connected to each other at only one connecting portion of said cylindrical barrel, said only one connecting portion being positioned either between said cylindrical neck portion and an upper end portion of said cylindrical barrel or between a lower end portion of said cylindrical barrel and said bottom.

7. The bottle container according to claim 5, wherein said connecting portion includes surfaces of said upper part of the bottle container and said lower part of the bottle container that contact each other so as to directly connect said upper part of the bottle container and said lower part of the bottle container to each other.

8. The bottle container according to claim 5, wherein said cover member completely fills said annular connecting groove.

* * * * *